(12) United States Patent
Shimazu

(10) Patent No.: US 6,934,509 B1
(45) Date of Patent: Aug. 23, 2005

(54) SATELLITE BROADCASTING SYSTEM CAPABLE OF DESIGNATING AREAS FOR BROADCASTING PROGRAM AND SATELLITE BROADCASTING RECEPTION APPARATUS

(75) Inventor: Hideo Shimazu, Tokyo (JP)

(73) Assignee: NEC Corporation, Tokyo (JP)

( * ) Notice: Subject to any disclaimer, the term of this patent is extended or adjusted under 35 U.S.C. 154(b) by 826 days.

(21) Appl. No.: 09/695,141

(22) Filed: Oct. 25, 2000

(30) Foreign Application Priority Data

Oct. 28, 1999 (JP) .......................................... 11-307560

(51) Int. Cl.$^7$ ................................................ H04H 1/00
(52) U.S. Cl. ..................... 455/3.02; 455/456; 455/12.1; 455/427; 455/425; 455/414.1; 201/213; 201/200; 201/214; 201/300; 340/988; 340/426.72; 340/995.2; 340/995.22; 340/995.24; 340/995.27
(58) Field of Search ................................ 701/213, 200, 701/214, 300; 340/988, 426.22, 995.2, 995.22, 995.24, 995.27, 995.25; 455/FOR 215, 3.02, 456, 12.1

(56) References Cited

U.S. PATENT DOCUMENTS 6,115,667 A * 9/2000 Nakamura .................. 701/200

FOREIGN PATENT DOCUMENTS

| JP | 06-104856 A | 4/1994 |
| JP | 07-154340 A | 6/1995 |
| JP | 08-191255 A | 7/1996 |
| JP | 09-055673 A | 2/1997 |
| JP | 09-163352 A | 6/1997 |
| JP | 09-270093 A | 10/1997 |

* cited by examiner

Primary Examiner—Sinh Tran
Assistant Examiner—David Nguyen
(74) Attorney, Agent, or Firm—Sughrue Mion, PLLC

(57) ABSTRACT

A satellite broadcasting system is disclosed wherein, when a broadcasting program is broadcast by satellite broadcasting, each viewer can receive a different broadcasting program depending upon the district in which the viewer is present. A broadcasting program is composed of an area designation part in which a list of areas in which the broadcasting program is to be broadcast is accommodated and broadcasting contents themselves. The broadcasting program is received by a radio wave reception section. A current position acquisition section detects the current position of a receiver. The current position is compared with an area to physical district coordination table and converted into an area name by a current area detection section. If the area name outputted from the current area detection section is included in the area designation part of the broadcasting program received from the radio wave reception section, then a broadcasting propriety discrimination section outputs the contents part of the broadcasting program to are production section. Alternatively, if the area name is included in the area designation part of the broadcasting program, then the broadcasting propriety discrimination section refrains itself from outputting the contents part of the broadcasting program to the reproduction section.

12 Claims, 3 Drawing Sheets

SATELLITE BROADCASTING SYSTEM CAPABLE OF DESIGNATING AREAS FOR BROADCASTING PROGRAM AND SATELLITE BROADCASTING RECEPTION APPARATUS

BACKGROUND OF THE INVENTION

1. Field of the Invention

The present invention relates to a satellite broadcasting system and a satellite broadcasting reception apparatus for digital satellite broadcasting provided to users of cars, and more particularly to a satellite broadcasting system and a satellite broadcasting reception apparatus by which selective reception of digital satellite broadcasting is allowed.

2. Description of the Related Art

Digital satellite broadcasting is being popularized in various countries including Japan and the United States.

One of significant differences of digital satellite broadcasting from ground wave broadcasting is that simultaneous broadcasting over a wide area is possible. The overall land of Japan can be covered only by a single satellite, and also the overall land of the United States is covered by a small number of satellites. On the other hand, if it is tried to cover the overall land of Japan using ground wave broadcasting, then since the ground wave broadcasting must be repeated by local related broadcasting stations, a very high maintenance cost is required. The difference in cost is significant particularly where an advertisement is broadcast. Where an image advertisement of a large corporation wherein the same contents are advertised over the overall land is involved, the cost is lower where satellite broadcasting is used.

Meanwhile, an advertisement is sometimes different in significance depending upon a district. For example, when it is desired to broadcast an advertisement (CM) of goods for a snowy district in a snowy district, there is no meaning if the advertisement is broadcast in Okinawa in which it does not snow. Further, it is impossible for a local minor maker to pay the fare for a CM to be broadcast over the overall country, and where a distribution channel is not developed except the district of the maker, it is considered sufficient if the CM is broadcast only in the district.

Further, in such a nation in which the authorities of local governments are strong such as the United States, contents which can be advertised may be different among different states. For example, advertisement of liquors may be prohibited in some state, or advertisement of guns may be inhibited in another state. In such a case, since a broadcasting station cannot broadcast an advertisement of liquors in a state in which advertisement of liquors is prohibited, it is necessary to segment the nation into several districts and apply different advertisement contents to the districts. Ground wave broadcasting is suitable for such advertisement.

In this manner, while satellite broadcasting is convenient where the same CM or the same broadcasting contents are to be broadcast all at once over the overall nation, it cannot be broadcast in different contents to segmented districts of the nation. Naturally, digital satellite broadcasting makes it possible to allocate different channels to different districts because a greater number of channels than that which can be assured by analog broadcasting can be assured by digital compression. However, this is wasteful in that a plurality of channels are used wastefully. For example, in the United State, if a broadcasting area is segmented in a unit of a state, then one channel is allocated to each state, and 50 channels are required for the 50 states. Since broadcasting of the 50 channels is broadcast over the overall nation, some waste occurs.

SUMMARY OF THE INVENTION

It is an object of the present invention to provide a satellite broadcasting system and a satellite broadcasting reception apparatus wherein, when a broadcasting program is broadcast by satellite broadcasting, each viewer can receive a different broadcasting program depending upon the district in which the viewer is present.

One of viewers who most enjoys the profit provided by the satellite broadcasting system and the satellite broadcasting reception apparatus of the present invention might be a driver who moves on a car. The satellite broadcasting system and the satellite broadcasting reception apparatus of the present invention realize that, for example, if a driver moves from a certain state into another state of the United States on a car, then since different laws apply in the latter state, an advertisement (for example, an "advertisement of liquors") which might have been enjoyed in the former state cannot be enjoyed any more in the new state.

In order to attain the object described above, according to the present invention, there is provided a satellite broadcasting system for broadcasting a broadcasting program to be broadcast all at once to many and unspecified apparatus over a wide range through a satellite, comprising a transmission apparatus, and at least one reception apparatus, the transmission apparatus including means for multiplexing an area designation part and a contents part to produce the broadcasting program, and means for transmitting the broadcasting program; the reception apparatus including a radio wave reception section for receiving a broadcasting program, a current position acquisition section for detecting a current position of the reception apparatus, an area to physical district coordination table including pairs of information each of which represents an area name and a physical district of the area name, a current area detection section for searching for an area name which includes the current position detected by the current position acquisition section from within the area to physical district coordination table and outputting the searched out area name, a broadcasting propriety discrimination section for comparing the area name outputted from the current area detection section and the area designation part of the broadcasting program received from the radio wave reception section with each other and outputting the contents part of the broadcasting program or refraining the broadcasting propriety discrimination section itself from outputting the contents part of the broadcasting program when the area name is included in the area designation part, and a reproduction section for receiving and reproducing the contents part of the broadcasting program outputted from the broadcasting propriety discrimination section.

The satellite broadcasting system is advantageous in that the broadcasting station side can designate only in which areas a broadcasting program to be sent from the broadcasting side should be enjoyed. Conventionally, such measures as to restrict viewers as just described are not taken because it is desired that a broadcasting program is enjoyed by people as many as possible. The satellite broadcasting system of the present invention is advantageous specifically in that, for example, where such mandatory control that "an advertisement of liquors must not be broadcast as a CM in the ABC state" is legally applicable, it is possible to realize it for the broadcasting station side to broadcast broadcasting contents in segmented areas while digital satellite broadcasting which is broadcast uniformly over a wide area is used.

The above and other objects, features and advantages of the present invention will become apparent from the following description and the appended claims, taken in conjunction with the accompanying drawings.

DESCRIPTION OF THE PREFERRED EMBODIMENT

Figure 2:
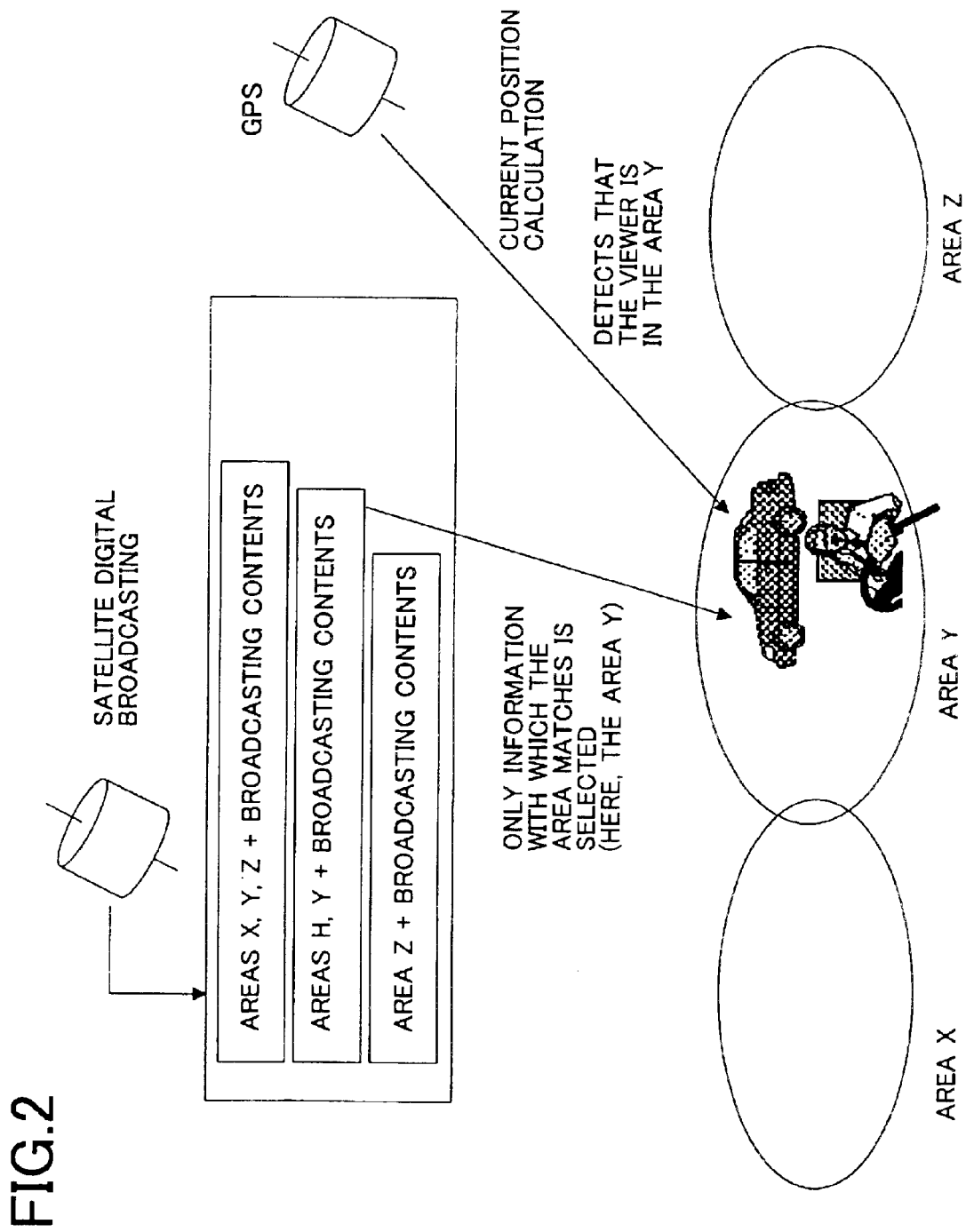
FIG. 2 is a flow diagram illustrating a concept of the satellite broadcasting system of FIG. 1.

Referring first to FIG. 2, there is illustrated a concept of a satellite broadcasting system to which the present invention is applied. A broadcasting program originated from a broadcasting station and broadcast toward the ground from an artificial satellite includes information representative of areas in addition to broadcasting contents, and a receiver owned by each viewer reproduces, only when the current position of the owner of the receiver is included in the information representative of the areas, corresponding contents. For example, when the owner of the receiver is in the area Y shown in FIG. 2, only that one or ones of broadcasting programs which include the area Y in the information representative of the areas therein (in FIG. 2, only contents of the second broadcasting program from above can be reproduced by the receiver of the owner in the area Y).

Figure 1:
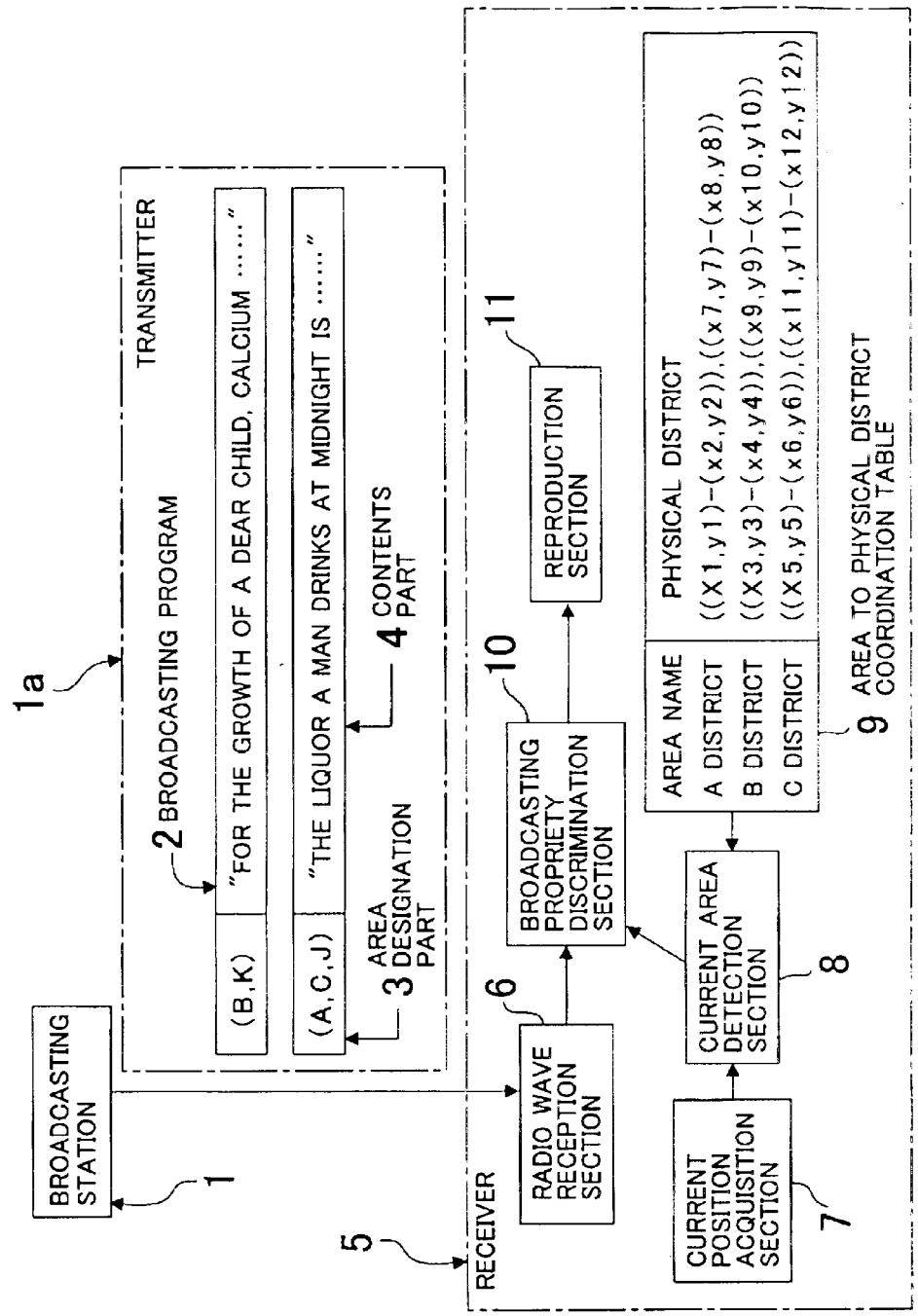
FIG. 1 is a flow diagram showing a satellite broadcasting system to which the present invention is applied.

Referring now to FIG. 1, there is shown a construction of a satellite broadcasting system to which the present invention is applied. The satellite broadcasting system includes a transmitter 1a of a broadcasting station 1 for satellite broadcasting and at least for one receiver 5 for receiving the satellite broadcasting from the broadcasting station 1. The transmitter 1a of the broadcasting station 1 multiplexes an area designation part 3 and a contents part 4 to produce a broadcasting program 2 and transmits the broadcasting program 2 as a radio wave toward a satellite.

The broadcasting program 2 includes the area designation part 3 in which a list of areas in which the broadcasting program 2 is to be broadcast and the contents part 4 in which broadcasting contents themselves are accommodated, and is produced by multiplexing the area designation part 3 and the contents part 4 by means of the transmitter 1a in the broadcasting station 1.

The receiver 5 includes a radio wave reception section 6 for receiving the broadcasting program 2 sent from the broadcasting station 1 through the satellite, a current position acquisition section 7 for detecting the current position of the receiver 5, an area to physical district coordination table 9 including pairs of information each of which includes representations of an area name and a physical district of the area name, a current area detection section 8 for receiving the current position outputted from the current position acquisition section 7 and finding out and outputting an area name in which the current position is included from within the area to physical district coordination table 9, a broadcasting propriety discrimination section 10 for receiving the area name outputted from the current area detection section 8 and the area designation part 3 in the broadcasting program 2 received from the radio wave reception section 6 and outputting, if the area name is included in the area designation part 3, the contents part 4 of the broadcasting program 2, whereas it does not output anything if the area name is not included in the area designation part 3, and a reproduction section 11 for receiving and reproducing the contents part 4 of the broadcasting program 2 outputted from the broadcasting propriety discrimination section 10.

The broadcasting propriety discrimination section 10 may be constructed reversely such that, if the area name is included in the area designation part 3, then the contents part 4 of the broadcasting program 2 is not outputted, but if the area name is not included in the area designation part 3, then the contents part 4 of the broadcasting program 2 is outputted. In other words, the area designation part 3 of the broadcasting program 2 may conversely include names of areas in which the broadcasting program 2 should not be broadcast.

The broadcasting station 1 can be constructed from equipments for ordinary digital satellite broadcasting except only that equipments for multiplexing the area designation part 3 and the contents part 4 are additionally required. The area designation part 3 describes only those areas in which the broadcasting may be broadcast as seen in FIG. 1 (or conversely should be prohibited). For example, in FIG. 1, it can be seen that a CM "For the growth of a dear child, . . . " should be broadcast only in the area B and the area K, and another CM "The liquor a man drinks at midnight . . . " should be broadcast only in the area A, the area C and the area J. The information of the area designation part 3 in which areas in which each broadcasting program should be broadcast are designated is, in an ordinary application form, determined by the broadcasting station side and annexed to the contents part 4.

The contents part 4 accommodates therein contents themselves to be broadcast. The contents themselves may assume a compressed form of voice, sound, image or the like. When the broadcasting program 2 is sent as a ratio wave from the broadcasting station 1, the radio wave reception section 6 receives the radio wave.

Independently of the operation of the radio wave reception section 5, the current position acquisition section 7 normally checks the current physical position of the viewer. A typical apparatus which implements such normal checking is the GPS (Global Positioning System) incorporated in car navigation products. Where the GPS is used, the latitude and the longitude of the current position can be measured to accuracy of several meters.

Figure 3:
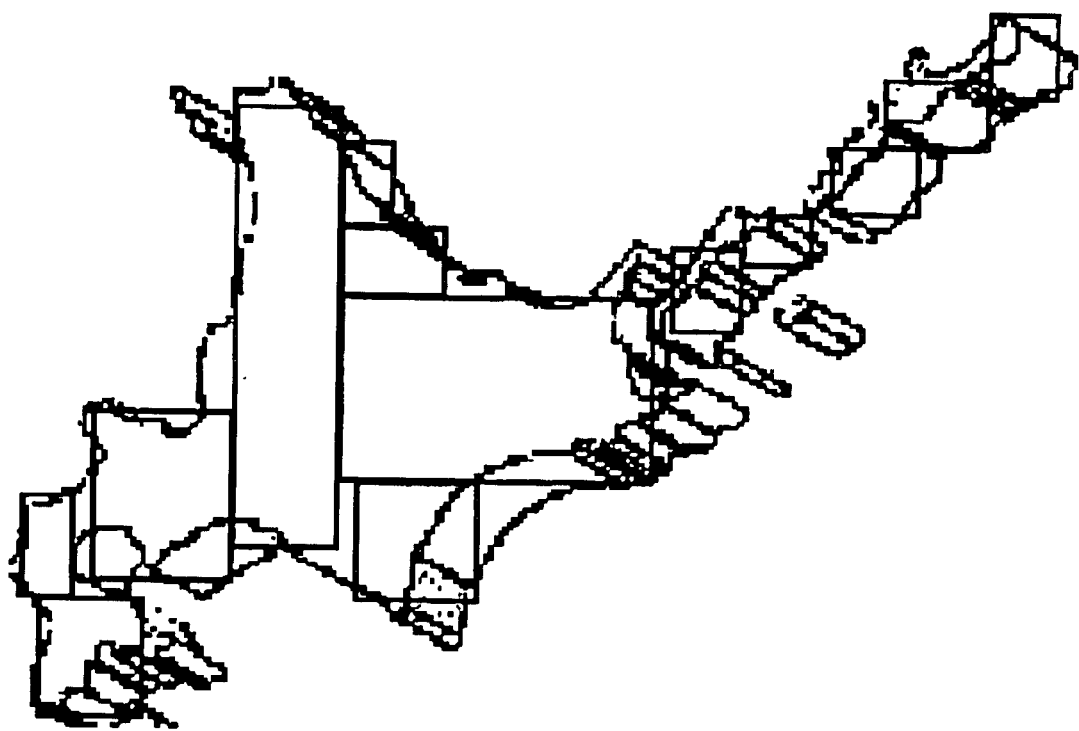
FIG. 3 is a diagrammatic view showing an example of contents of an area designation part of a broadcasting program used in the satellite broadcasting system of FIG. 1.

In the satellite broadcasting system of the present embodiment, the area to physical district coordination table 9 represents an area in the following manner. In particular, the area to physical district coordination table 9 represents an area with a set of plural-rectangles of various sizes as seen in FIG. 3. One rectangle is represented by a pair of the latitude and the longitude of the point at the left upper corner of the rectangle and the latitude and the longitude of the point at the right lower corner of the rectangle.

If the current area detection section 8 receives the current latitude and longitude information of the viewer from the current position acquisition section 7, then it refers to the area to physical district coordination table 9 to check to which area the current position of the viewer belongs and then delivers a result of the check to the broadcasting propriety discrimination section 10.

Now, the current position of the viewer is represented by (Xc, Yc). Where the latitude and the longitude of the point at the left upper corner of an certain rectangular area are represented by (Xul, Yul) and the latitude and the longitude of the point at the right lower corner of the rectangular area are represented by (Xlr, Ylr), whether or not the current position of the viewer is included in the rectangular area can be discriminated from whether or not the following expression is satisfied.

$$(Xul>Xc>Xlr) \text{ and } (Yul>Yc>Ylr) \tag{1}$$

When this expression is not satisfied, the current position of the viewer is not included in this rectangular area.

As seen in FIG. 3, a certain area is usually represented by a set of plural rectangles. Accordingly, in order to determine that the current position of the viewer is included in such a lie of the land as shown in FIG. 3 (in which Hokkaido is shown as an example), the relationship of the expression (1) must be satisfied in one of the rectangles of the set of rectangles which covers Hokkaido. It is to be noted that, while an area in the present embodiment is represented by a set of rectangles, some other representation method may be applicable. For example, also a method is possible wherein an area is represented not by a set of rectangles but by a set of polygons (triangles, squares, pentagons or the like). Accordingly, in the present invention, to set an approximate representation of an area to a set of rectangles is merely for the convenience in architecture of an apparatus, and this does not relate to the essence of the present invention.

The broadcasting propriety discrimination section 10 refers to the area designation part 3 of the received broadcasting program 2 to check whether or not the area in which the viewer is currently present is included in the area designation part 3. If the area is included, then the broadcasting propriety discrimination section 10 delivers the contents of the contents part 4 to the reproduction section 11. If the area is not included, then the contents part 4 is abandoned.

While a preferred embodiment of the present invention has been described using specific terms, such description is for illustrative purposes only, and it is to be understood that changes and variations may be made without departing from the spirit or scope of the following claims.

What is claimed is:

1. A satellite broadcasting system for broadcasting a broadcasting program to be broadcast all at once to many and unspecified apparatus over a wide range through a satellite, comprising:

a transmission apparatus; and at least one reception apparatus;

said transmission apparatus including means for multiplexing an area designation part and a contents part to produce the broadcasting program, and means for transmitting the broadcasting program;

said reception apparatus including a radio wave reception section for receiving a broadcasting program, a current position acquisition section for detecting a current position of said reception apparatus, an area to physical district coordination table including pairs of information each of which represents an area name and a physical district of the area name, a current area detection section for searching for an area name which includes the current position detected by said current position acquisition section from within said area to physical district coordination table and outputting the searched out area name, a broadcasting propriety discrimination section for comparing the area name outputted from said current area detection section and the area designation part of the broadcasting program received from said radio wave reception section with each other and outputting the contents part of the broadcasting program when the area name is included in the area designation part, and a reproduction section for receiving and reproducing the contents part of the broadcasting program outputted from said broadcasting propriety discrimination section.

2. The satellite broadcasting system of claim 1, wherein said transmission apparatus is a satellite transmission apparatus.

3. A satellite broadcasting system for broadcasting a broadcasting program to be broadcast all at once to many and unspecified apparatus over a wide range through satellite, comprising:

a transmission apparatus; and at least one reception apparatus;

multiplexing an area designation part and a contents part to produce the broadcasting program, and means for transmitting the broadcasting program;

said reception apparatus including a radio wave reception section for receiving a broadcasting program, a current position acquisition section for detecting a current position of said reception apparatus, an area to physical district coordination table including pairs of information each of which represents an area name and a physical district of the area name, a current area detection section for searching for an area name which includes the current position detected by said current position acquisition section from within said area to physical district coordination table and outputting the searched out area name, a broadcasting propriety discrimination section for comparing the area name outputted from said current area detection section and the area designation part of the broadcasting program received from said radio wave reception section with each other and refraining said broadcasting propriety discrimination section itself from outputting the contents part of the broadcasting program when the area name is included in the area designation part, and a reproduction section for receiving and reproducing the contents part of the broadcasting program outputted from said broadcasting propriety discrimination section.

4. The satellite broadcasting system of claim 3, wherein said transmission apparatus is a satellite transmission apparatus.

5. A satellite broadcasting reception apparatus, comprising:

a radio wave reception section for receiving a broadcasting program in which an area designation part and a contents part are multiplexed;

a current position acquisition section for detecting a current position of said reception apparatus;

an area to physical district coordination table including pairs of information each of which represents an area name and a physical district of the area name;

a current area detection section for searching for an area name which includes the current position detected by said current position acquisition section from within said area to physical district coordination table and outputting the searched out area name;

a broadcasting propriety discrimination section for comparing the area name outputted from said current area detection section and the area designation part of the broadcasting program received from said radio wave reception section with each other and outputting the contents part of the broadcasting program when the area name is included in the area designation part; and a reproduction section for receiving and reproducing the contents part of the broadcasting program outputted from said broadcasting propriety discrimination section.

6. The satellite broadcasting reception apparatus of claim 5, wherein said radio wave reception section receives said broadcasting program from a satellite.

7. A satellite broadcasting reception apparatus, comprising:

a radio wave reception section for receiving a broadcasting program in which an area designation part and a contents part are multiplexed;

a current position acquisition section for detecting a current position of said reception apparatus;

an area to physical district coordination table including pairs of information each of which represents an area name and a physical district of the area name;

a current area detection section for searching for an area name which includes the current position detected by said current position acquisition section from within said area to physical district coordination table and outputting the searched out area name;

a broadcasting propriety discrimination section for comparing the area name outputted from said current area detection section and the area designation part of the broadcasting program received from said radio wave reception section with each other and refraining said broadcasting propriety discrimination section itself from outputting the contents part of the broadcasting program when the area name is included in the area designation part; and a reproduction section for receiving and reproducing the contents part of the broadcasting program outputted from said broadcasting propriety discrimination section.

8. The satellite broadcasting reception apparatus of claim 7, wherein said radio wave reception section receives said broadcasting program from a satellite.

9. A satellite broadcasting system for broadcasting a broadcasting program to be broadcast all at once to many and unspecified apparatus over a wide range through a satellite, comprising:

a transmission apparatus; and at least one reception apparatus;

said transmission apparatus including means for multiplexing a plurality of area designation parts and a contents parts to produce a plurality of broadcasting programs, wherein each of said programs comprises an area designation part and a contents part, and means for transmitting the broadcasting programs;

said reception apparatus including a radio wave reception section for receiving a broadcasting program, a current position acquisition section for detecting a current position of said reception apparatus, an area to physical district coordination table including pairs of information each of which represents an area name and a physical district of the area name, a current area detection section for searching for an area name which includes the current position detected by said current position acquisition section from within said area to physical district coordination table and outputting the searched out area name, a broadcasting propriety discrimination section for comparing the area name outputted from said current area detection section and the area designation part of the broadcasting program received from said radio wave reception section with each other and outputting the contents part of the broadcasting program when the area name is included in the area designation part, and a reproduction section for receiving and reproducing the contents part of the broadcasting program outputted from said broadcasting propriety discrimination section.

10. A satellite broadcasting system for broadcasting a broadcasting program to be broadcast all at once to many and unspecified apparatus over a wide range through a satellite, comprising:

a transmission apparatus; and at least one reception apparatus;

multiplexing a plurality of area designation parts and a contents parts to produce a plurality of broadcasting programs, wherein each of said programs comprises an area designation part and a contents part, and means for transmitting the broadcasting programs;

said reception apparatus including a radio wave reception section for receiving a broadcasting program, a current position acquisition section for detecting a current position of said reception apparatus, an area to physical district coordination table including pairs of information each of which represents an area name and a physical district of the area name, a current area detection section for searching for an area name which includes the current position detected by said current position acquisition section from within said area to physical district coordination table and outputting the searched out area name, a broadcasting propriety discrimination section for comparing the area name outputted from said current area detection section and the area designation part of the broadcasting program received from said radio wave reception section with each other and refraining said broadcasting propriety discrimination section itself from outputting the contents part of the broadcasting program when the area name is included in the area designation part, and a reproduction section for receiving and reproducing the contents part of the broadcasting program outputted from said broadcasting propriety discrimination section.

11. A satellite broadcasting reception apparatus, comprising:

a radio wave reception section for receiving a plurality of broadcasting programs in which a plurality of area designation parts and contents parts are multiplexed, wherein each of said programs comprises an area designation part and a contents part;

a current position acquisition section for detecting a current position of said reception apparatus;

an area to physical district coordination table including pairs of information each of which represents an area name and a physical district of the area name;

a current area detection section for searching for an area name which includes the current position detected by said current position acquisition section from within said area to physical district coordination table and outputting the searched out area name;

a broadcasting propriety discrimination section for comparing the area name outputted from said current area detection section and the area designation part of the broadcasting programs received from said radio wave reception section with each other and outputting the contents part of the broadcasting programs when the area name is included in the area designation part; and a reproduction section for receiving and reproducing the contents part of the broadcasting programs outputted from said broadcasting propriety discrimination section.

12. A satellite broadcasting reception apparatus, comprising:

a radio wave reception section for receiving a plurality of broadcasting programs in which a plurality of area designation parts and contents parts are multiplexed, wherein each of said programs comprises an area designation part and a contents part;

a current position acquisition section for detecting a current position of said reception apparatus;

an area to physical district coordination table including pairs of information each of which represents an area name and a physical district of the area name;

a current area detection section for searching for an area name which includes the current position detected by said current position acquisition section from within said area to physical district coordination table and outputting the searched out area name;

a broadcasting propriety discrimination section for comparing the area name outputted from said current area detection section and the area designation part of the broadcasting programs received from said radio wave reception section with each other and refraining said broadcasting propriety discrimination section itself from outputting the contents part of the broadcasting programs when the area name is included in the area designation part; and a reproduction section for receiving and reproducing the contents part of the broadcasting programs outputted from said broadcasting propriety discrimination section.

* * * * *